United States Patent
Benhase et al.

(10) Patent No.: US 7,899,897 B2
(45) Date of Patent: *Mar. 1, 2011

(54) SYSTEM AND PROGRAM FOR DUAL AGENT PROCESSES AND DUAL ACTIVE SERVER PROCESSES

(75) Inventors: Linda Benhase, Tucson, AZ (US); John R. Paveza, Morgan Hill, CA (US); Michael Thomas Benhase, Tucson, AZ (US); Richard Anthony Ripberger, Tucson, AZ (US); Yan Xu, Tucson, AZ (US); Stella Chan, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/060,766

(22) Filed: Apr. 1, 2008

(65) Prior Publication Data

US 2008/0177823 A1 Jul. 24, 2008

Related U.S. Application Data

(63) Continuation of application No. 10/633,049, filed on Jul. 31, 2003, now Pat. No. 7,379,989.

(51) Int. Cl.
G06F 15/173 (2006.01)
G06F 11/00 (2006.01)

(52) U.S. Cl. .......................................... 709/223; 714/4

(58) Field of Classification Search .................... 709/223
See application file for complete search history.

(56) References Cited

U.S. PATENT DOCUMENTS

| | | |
|---|---|---|
| 5,623,625 A | 4/1997 | Thompson et al. |
| 5,696,895 A | 12/1997 | Hemphill et al. |
| 5,781,716 A | 7/1998 | Hemphill et al. |
| 5,829,019 A | 10/1998 | Thompson et al. |
| 5,835,696 A | 11/1998 | Hess |
| 5,996,086 A | 11/1999 | Delaney et al. |
| 6,005,920 A | 12/1999 | Fuller et al. |
| 6,061,504 A | 5/2000 | Tzelnic et al. |
| 6,108,699 A | 8/2000 | Moiin |
| 6,247,099 B1 | 6/2001 | Skazinski et al. |
| 6,606,708 B1* | 8/2003 | Devine et al. .................... 726/8 |
| 6,847,984 B1* | 1/2005 | Midgley et al. .................... 1/1 |
| 7,114,083 B2* | 9/2006 | Devine et al. ................ 713/152 |
| 7,272,613 B2* | 9/2007 | Sim et al. ............................. 1/1 |
| 7,315,826 B1* | 1/2008 | Guheen et al. .................... 705/7 |
| 7,379,989 B2 | 5/2008 | Benhase et al. |
| 2001/0014908 A1* | 8/2001 | Lo et al. ......................... 709/203 |
| 2001/0047412 A1 | 11/2001 | Weinman, Jr. |
| 2002/0049845 A1* | 4/2002 | Sreenivasan et al. .......... 709/226 |
| 2002/0194268 A1 | 12/2002 | Lai |
| 2003/0093467 A1 | 5/2003 | Anderson |
| 2003/0126202 A1* | 7/2003 | Watt ............................... 709/203 |
| 2004/0158605 A1 | 8/2004 | Benhase et al. |
| 2004/0193951 A1* | 9/2004 | Shaffer et al. ...................... 714/9 |
| 2005/0262319 A1 | 11/2005 | Satoyama et al. |

* cited by examiner

*Primary Examiner* — Firmin Backer
*Assistant Examiner* — James Edwards
(74) *Attorney, Agent, or Firm* — Janaki K. Davda; Konrad Raynes & Victor LLP

(57) ABSTRACT

Disclosed is a system and program for task processing and monitoring of configuration and state information. A first server process and a second server process are detected. A first agent process is registered with the first server process. A second agent process is registered with the second server process. When a task is to be executed by the first server process, the task is executed with the first agent process. When the task is to be executed by the second server process, the task is executed with the second agent process.

21 Claims, 11 Drawing Sheets

SYSTEM AND PROGRAM FOR DUAL AGENT PROCESSES AND DUAL ACTIVE SERVER PROCESSES

CROSS-REFERENCE TO RELATED APPLICATION

This application is a continuation application of and claims the benefit of "METHOD, SYSTEM, AND PROGRAM FOR DUAL AGENT PROCESSES AND DUAL ACTIVE SERVER PROCESSES", U.S. Pat. No. 7,379,989, issued on May 27, 2008, having application Ser. No. 10/633,049, filed Jul. 31, 2003, the disclosure of which is incorporated herein by reference in its entirety.

BACKGROUND OF THE INVENTION

1. Field of the Invention

The present invention is related generally to dual agent processes coupled to dual active server processes.

2. Description of the Related Art

Some systems include many components (e.g., server computers executing server processes) and attempt to provide fault tolerance so that there is no single point of failure. For example, if one component in the system fails, the entire system does not fail.

Continual availability of data services is important for disaster recovery situations in which customers need to recover access to their data immediately. To have continual availability of services provided, redundancy is important. Some conventional architectures include a primary server computer executing a primary server process and a backup server computer executing a backup server process. If an error occurs at the primary server process, the backup server process is used for processing while the primary server process is undergoing repair and/or recovery. The primary and backup server processes may be located at different physical sites. The use of the backup server process at an alternate or remote site can reduce the recovery time of the primary server process because the backup server process is continually able to process new requests.

An agent process is software that acts on behalf of, for example, a user or server process, to perform tasks within an application program. In some conventional computer systems, the agent process registers with the primary server process (i.e., notifies the server process that it exists). Then, the primary server process and the agent process can submit requests to each other, provide data to each other, etc. If the primary server process fails, then a user notifies the agent process that the agent process is to re-register with the backup server process. For example, the user may use a Web browser at a console connected to the agent process to notify the agent process to re-register with another server process. The term "Web" refers to the World Wide Web, which is a network of server computers that contain programs and files, which in turn may contain hypertext links to other documents available through the network. The term "Web browser" refers to a program that initiates requests to a Web server computer and displays the information that the Web server computer returns. The agent process then registers with the backup server process.

Requiring user intervention when a primary server computer and/or primary server process fails is time consuming and inefficient. This may also lead to human errors. Therefore, there is a need in the art for improved use of dual server processes.

SUMMARY OF THE INVENTION

Provided are a method, system, and program for task processing and monitoring of configuration and state information. A first server process and a second server process are detected. A first agent process is registered with the first server process. A second agent process is registered with the second server process. When a task is to be executed by the first server process, the task is executed with the first agent process. When the task is to be executed by the second server process, the task is executed with the second agent process.

The described implementations of the invention provide a method, system, and program for providing two agent processes in a cluster, with each agent process registered with a different active server process, so that the failure of one agent/server pair does not impact the other agent/server pair. Additionally, a cluster may access storage devices, and the configuration and state information of the storage devices of the cluster is sent to the active server processes via corresponding agent processes in the agent/server pairs.

BRIEF DESCRIPTION OF THE DRAWINGS

Referring now to the drawings in which like reference numbers represent corresponding parts throughout:

FIGS. 2A and 2C illustrate logic for processing initial configuration and state information at one cluster in accordance with certain implementations of the invention, while

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
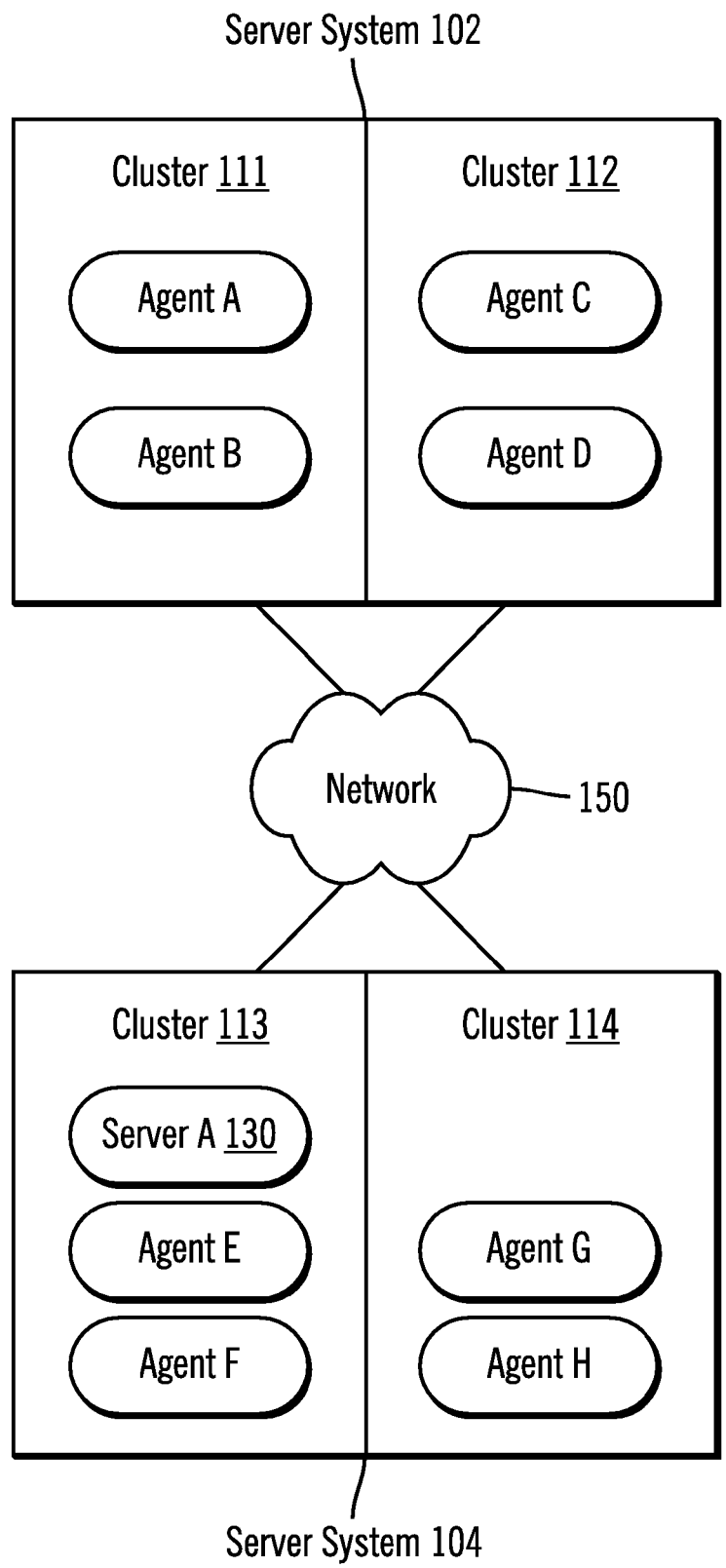
FIG. 1A illustrates, in a block diagram, a computing environment in accordance with certain implementations of the invention.

FIG. 1A illustrates, in a block diagram, a computing environment in accordance with certain implementations of the invention. Server systems 102 and 104 are interconnected through a network 150, such as a local area network (LAN), wide area network (WAN), or the Internet. The Internet is a world-wide collection of connected computer networks (i.e., a network of networks). Each server system 102 and 104 has two clusters (which may also be referred to as "server system clusters"). Although each server system 102 and 104 are illustrated with two clusters, in alternate implementations of the invention, each server system 102 and 104 may include fewer or more clusters. For example, server system 102 comprises clusters 111 and 112, which may be referred to as a left cluster 111 and a right cluster 112. Server system 104 comprises clusters 113 and 114. A cluster includes zero or more server processes and one or more pairs of agent processes. For example, cluster 111 includes agent processes (Agent A and Agent B), and cluster 113 includes a server process (Server-A) and agent processes (Agent E and Agent F). In this illustration the server process executes on one of the clusters.

Figure 1B:
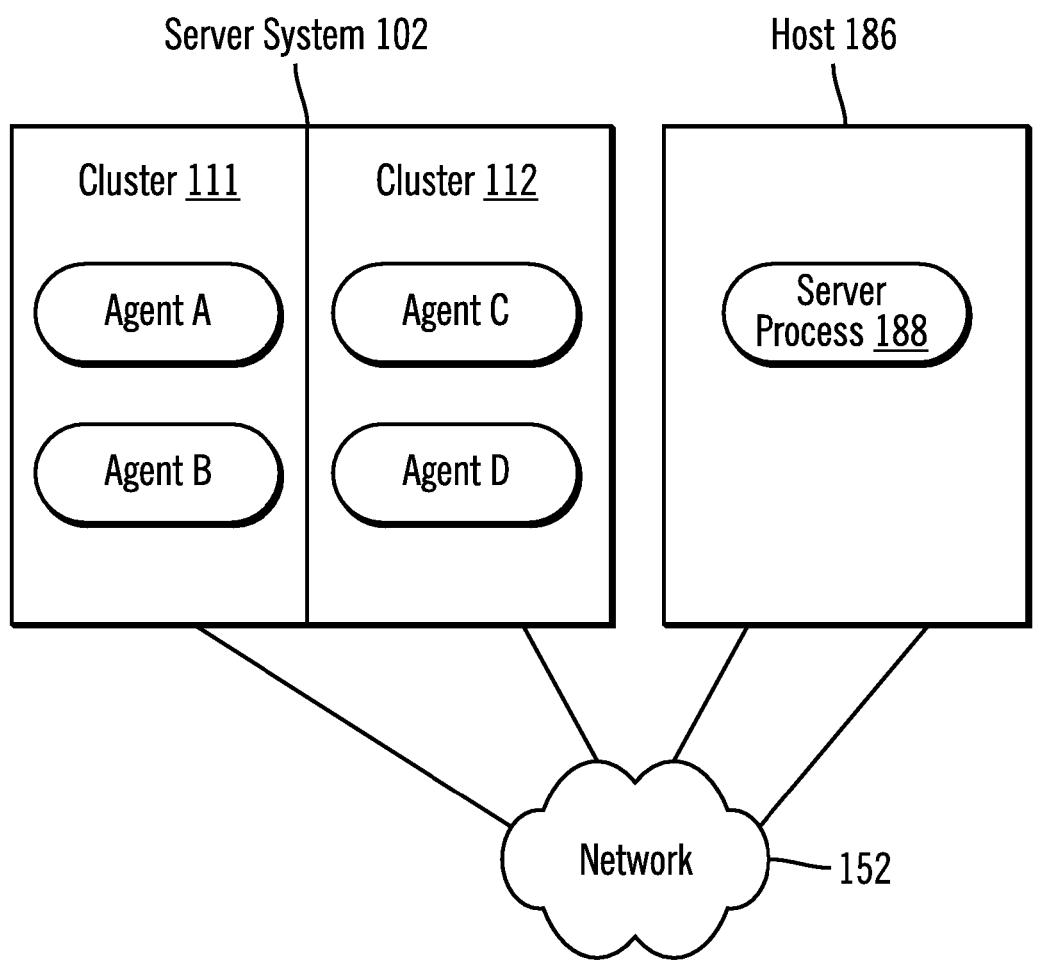
FIG. 1B illustrates, in a block diagram, a computing environment in accordance with certain other implementations of the invention.

FIG. 1B illustrates, in a block diagram, a computing environment in accordance with certain other implementations of the invention. Server system 102 is connected to a host system 186 via a network 152, such as a local area network (LAN), wide area network (WAN), or the Internet. In FIG. 1B, the server process 186 executes at the host system 188, rather than at a cluster. A host system may comprise any computing device known in the art, such as a mainframe, server, personal computer, workstation, laptop, handheld computer, telephony device, network appliance, virtualization device, storage controller, etc.

Figure 1C:
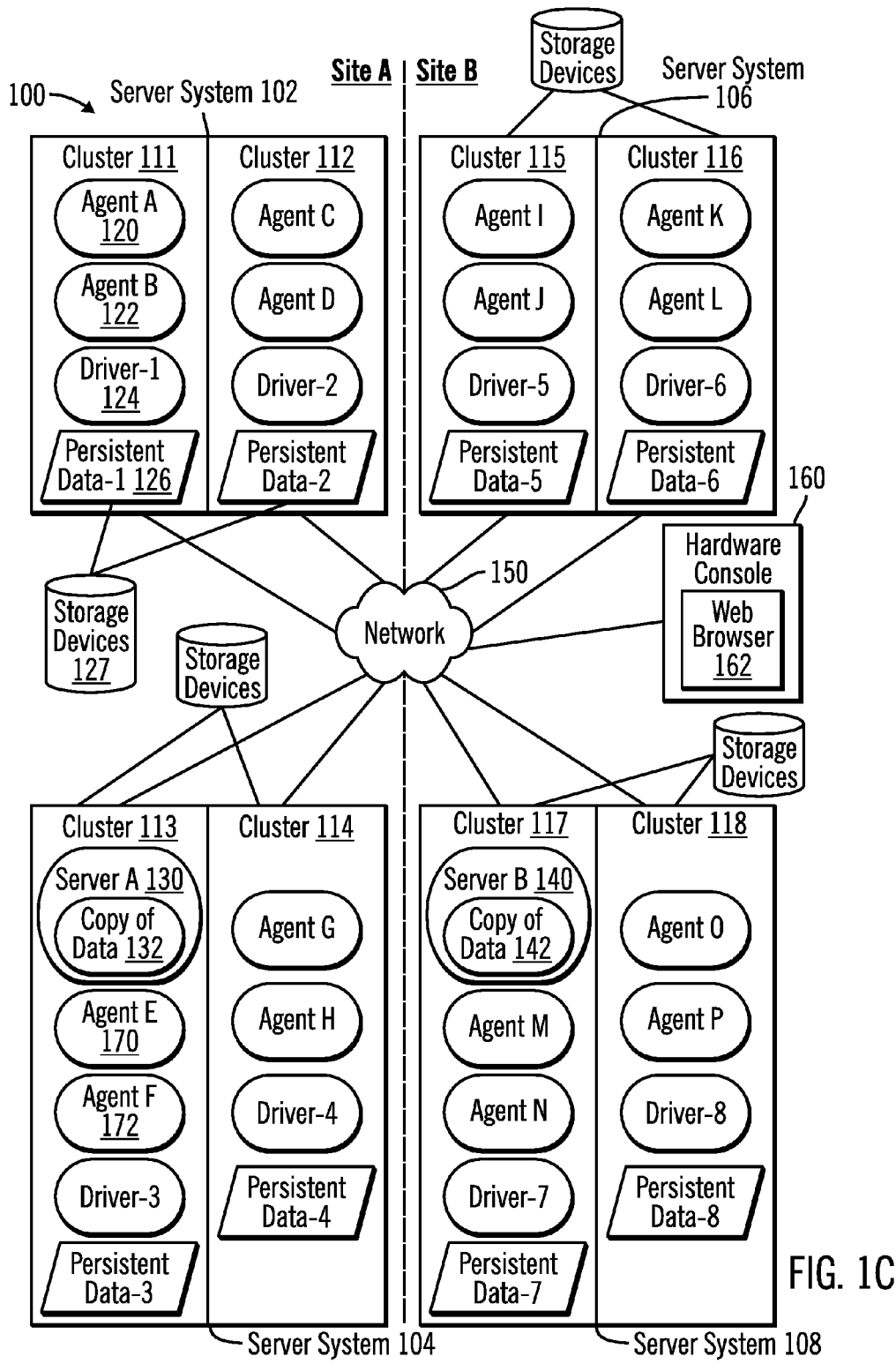
FIG. 1C illustrates, in a block diagram, further details of a computing environment illustrated in FIG. 1A in accordance with certain implementations of the invention.

FIG. 1C illustrates, in a block diagram, further details of a computing environment illustrated in FIG. 1A in accordance with certain implementations of the invention. A networked domain 100 includes various server systems 102, 104, 106, and 108 interconnected through a network such as a local area network (LAN), wide area network (WAN), or the Internet. The Internet is a world-wide collection of connected computer networks (i.e., a network of networks). A domain is a part of a computer network in which the data processing resources are under common control.

The server systems 102, 104, 106, and 108 in the network domain 100 may be viewed as being located at Site A and Site B. In the illustrated example, Site A includes server systems 102 and 104, while Site B includes server systems 106 and 108. In certain implementations of the invention, the server systems 102 and 140 at Site A and the server systems 106 and 108 at Site B may be physically far apart. Although four server systems 102, 104, 106, 108 are illustrated, fewer or more server systems may be used without departing from the scope of the invention. In certain implementations of the invention, server systems are implemented using an IBM TotalStorage Enterprise Storage Server™ (ESS), available from International Business Machines Corporation.

In addition to the clusters illustrated in FIG. 1A, FIG. 1C illustrates that server system 106 has clusters 115 and 116, and server system 108 has clusters 117 and 118. When the network domain 100 is configured, some clusters may be configured to be "domain servers". Domain servers include server processes, while clusters that are not configured as domain servers do not include server processes. In the example of FIG. 1C, clusters 113 and 117 have been configured as domain servers. Also, the server system has storage devices that are shared by the clusters in that server system. For example, clusters 111 and 112 of server system 102 share storage devices 127.

Each cluster includes zero or more server processes and one or more pairs of agent processes. For example, cluster 111 includes two agent processes (Agent A 120 and Agent B 122 and no server processes, while cluster 113 includes a server process (Server A 130), as well as agent processes (Agent E 170 and Agent F 172). A cluster also includes a driver process (e.g., Driver-1 124) and persistent data (e.g., Persistent Data-1 126) that is accessed by the agent processes in the cluster. Persistent data is stored in, for example, disk. When a cluster includes two agent processes, the agent processes may be referred to as a first agent process and a second agent process, and each agent process registers with a different server process. A hardware console 160 includes a Web browser 162 that can connect to the server processes (Server A 130 and Server B 140) and allows, for example, a system administrator or other user to submit tasks to the server processes for execution.

Each cluster has two agent processes that may be invoked to process tasks. Agent processes are invoked by server processes, such as Server A 130 or Server B 140. Each server process is aware of all agent processes that have registered with that server process. In each cluster 111, 112, 113, 114, 115, 116, 117, and 118, one agent process registers with one server process, and the other agent process registers with the other server process. For example, Agent A, Agent C, Agent E, Agent G, Agent I, Agent K, Agent M, and Agent O register with Server A 130. Agent B, Agent D, Agent F, Agent H, Agent J, Agent L, Agent N, and Agent P register with Server B 140. Then, Server A 130 and Server B 140 may invoke the respective registered agent processes to perform tasks. An agent process and a corresponding server process may be said to form an agent/server application or agent/server pair. For example, Agent B 122 and Server B 140 may be said to form an agent/server application or agent/server pair.

In particular, when the network domain 100 is configured, two agent processes are set up per cluster. Each cluster is aware of each server process. Each server process has a list of all agent processes within the domain that are registered with that server process. Each agent process in the cluster communicates with a different server process. Since each cluster includes two agent processes registered with different server processes, if one agent process fails, the other agent process may continue processing. If one server process in the domain 100 fails, the other server process may continue processing. Moreover, since a server system 102, 104, 106, 108 has two clusters, if one cluster fails, the other cluster in the server system may continue processing.

Figure 1D:
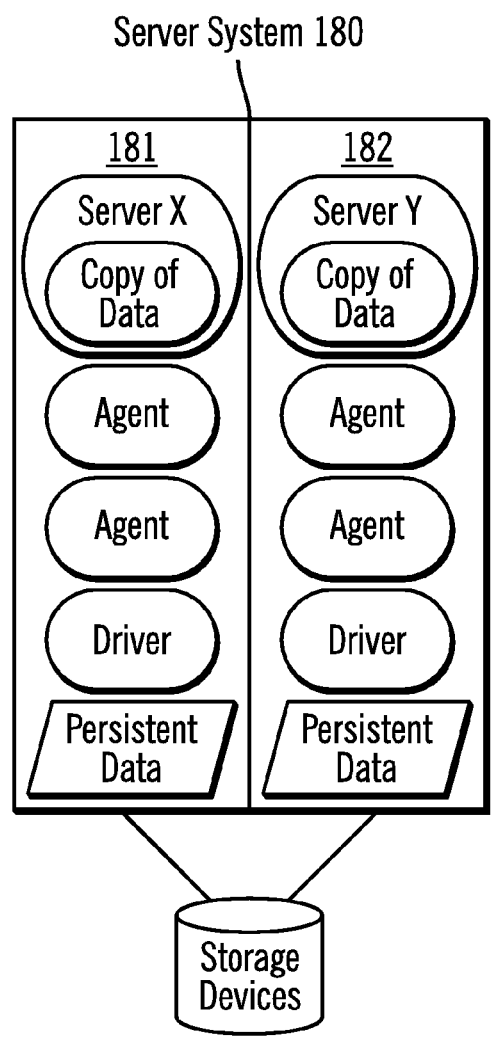
FIG. 1D illustrates, in a block diagram, a server system architecture in accordance with certain implementations of the invention.

FIG. 1D illustrates, in a block diagram, a server system 180 architecture in accordance with certain implementations of the invention. In FIG. 1B, each cluster 181 and 182 includes a server process (i.e., Server X and Server Y). The server system 180 may be part of a network domain (not shown).

Figure 1E:
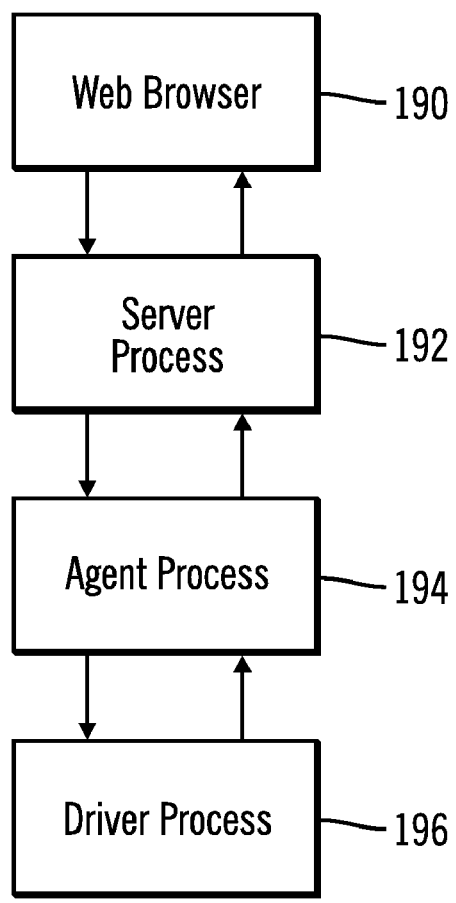
FIG. 1E illustrates flow of control between processes in accordance with certain implementations of the invention.

FIG. 1E illustrates flow of control between processes in accordance with certain implementations of the invention. A Web browser 190 (e.g., Web browser 162) sends a task to a server process 192 (e.g., Server A 130). The server process 192 invokes an agent process 194 (e.g., Agent A 120) to perform the task. The agent process 194 forwards the task to a driver process 196 (e.g., Driver-1 124) for execution of the task. The driver process 196 executes the task and transmits information regarding task execution to the agent process 194. The agent process 194 transmits information regarding task execution to the server process 192. The server process 192 transmits information regarding task execution to the Web browser 190. Although examples herein refer to a particular process (e.g., a driver process) performing processing, the process may actually invoke one or more other processes to perform the processing.

Figure 2A:
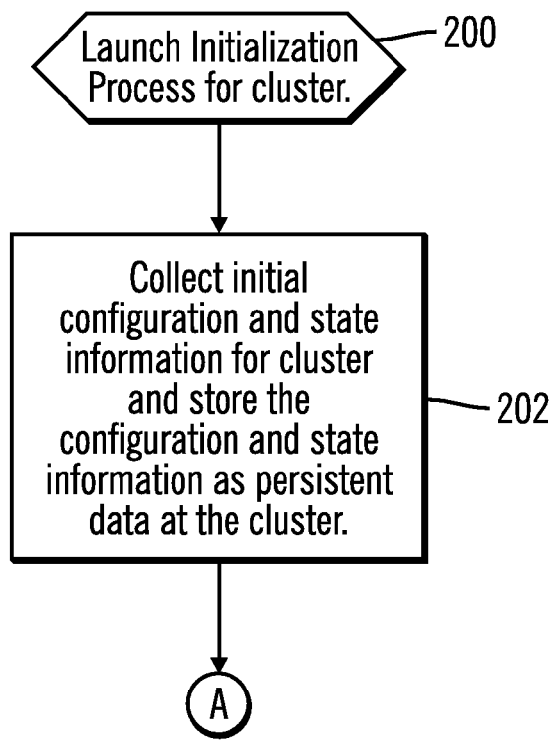
Figure 2B:
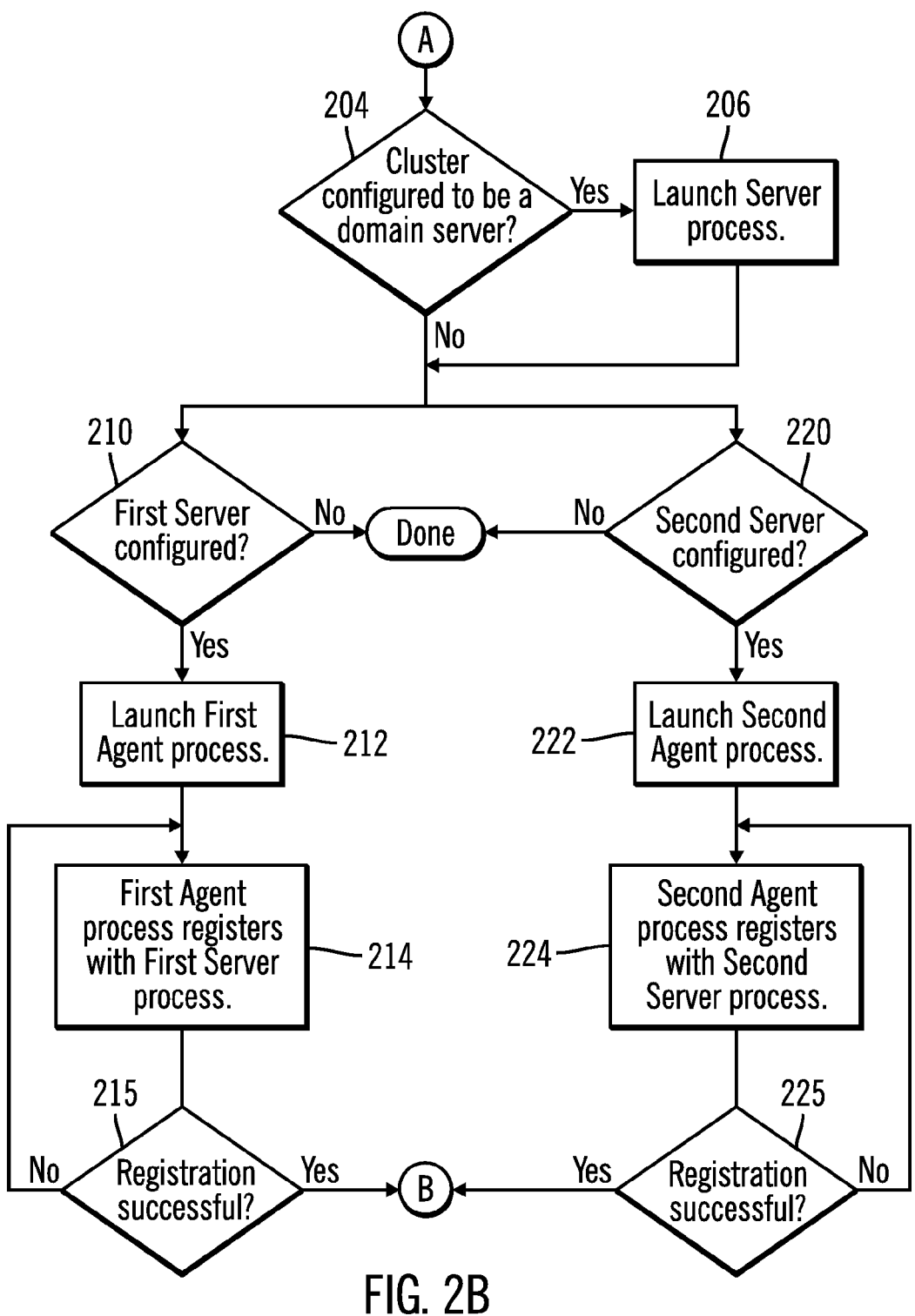
FIG. 2B illustrates logic for startup of server and agent processes at one cluster in accordance with certain implementations of the invention.
Figure 2C:
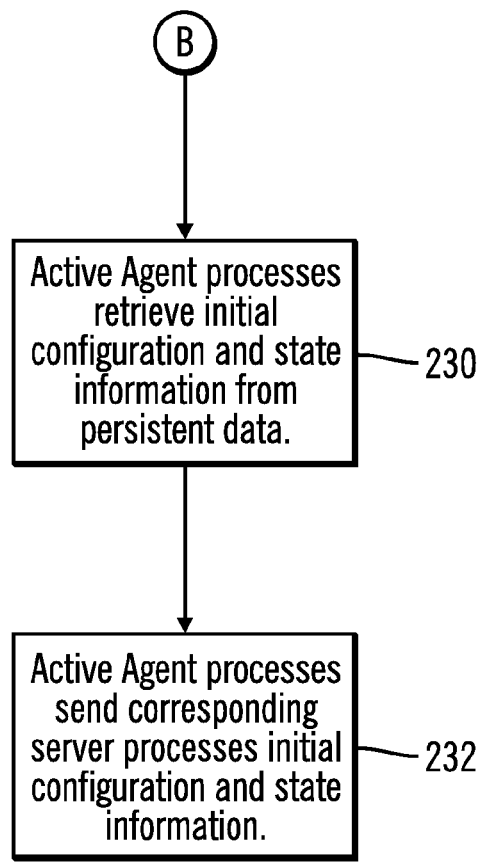

FIGS. 2A and 2C illustrate logic for processing initial configuration and state information at one cluster in accordance with certain implementations of the invention, while FIG. 2B illustrates logic for startup of server and agent processes at one cluster in accordance with certain implementations of the invention. Control begins in FIG. 2A at block 200 with the initialization process launching. There are various conditions that may result in the initialization process launching. For example, the initialization process may launch when a server system is started (e.g., powered-on), when a user initiates the process using the Web browser 162, or when a system administrator initiates the process using the Web browser 162 or a different user interface.

In block 202, a collection and storage process that is automatically launched when the initialization process is launched collects initial configuration information (e.g., how many storage devices are in the cluster) and state information (e.g., whether each storage device is available or unavailable) and stores the initial configuration and state information as persistent data at the cluster.

In block 204 (FIG. 2B), it is determined whether the cluster is configured as a domain server. A cluster may be configured as a domain server by, for example, a system administrator, when the domain is being configured. When a cluster is configured as a domain server, the cluster includes a server process. In the example of FIG. 1C, cluster 111 is not configured as a domain server, but cluster 113 is configured as a domain server. Therefore, when the logic of FIGS. 2A, 2B, and 2C is performed for cluster 111, in block 204 it will be determined that cluster 111 is not configured as a domain server. When the logic of FIGS. 2A, 2B, and 2C is performed for cluster 113, it will be determined that cluster 113 is configured as a domain server.

If the cluster is configured as a domain server, processing continues to block 206, otherwise, processing continues to blocks 210 and 220. In block 206, the server process is launched (i.e., the server process is started). The server process is then able to process tasks received from the Web browser 162.

In certain implementations, processing at blocks 210-214 and 220-224 is performed concurrently. In certain alternative implementations, processing at blocks 210-214 and 220-224 may be performed sequentially or some processing may be performed sequentially and other processing may be performed concurrently.

In block 210, it is determined whether a first server is configured. The first server is a domain server with which the first agent process is to register. If so, processing continues to block 212, otherwise, processing is done. In block 212, a first agent process (e.g., Agent A 120) is launched. In block 214, the first agent process (e.g., Agent A 120) registers with the first server process (e.g., Server A 120). In block 215, it is determined whether the registration was successful. If so, processing continues to block 230, otherwise, processing returns to block 214 to attempt registration again. In certain implementations of the invention, registration is attempted until the first agent process is successfully registered. In certain other implementations of the invention, registration is attempted a certain number of times (e.g., three times).

In block 220, it is determined whether a second server (e.g., Server B 140) is configured. The second server is a domain server with which the second agent process is to register. If so, processing continues to block 222, otherwise, processing is done. In block 222, a second agent process (e.g., Agent B) is launched. In block 224, the second agent process (e.g., Agent B) registers with the second server process (e.g., Server B). In block 225, it is determined whether the registration was successful. If so, processing continues to block 230, otherwise, processing returns to block 224 to attempt registration again. In certain implementations of the invention, registration is attempted until the first agent process is successfully registered. In certain other implementations of the invention, registration is attempted a certain number of times (e.g., three times).

In FIG. 2C, in block 230, active agent processes retrieve initial configuration and state information from persistent data in a cluster in which the active agent is located. An active agent is any agent that is running. In block 232, active agent processes send initial configuration and state information to corresponding server processes. For example, the first agent process (e.g., Agent A) sends initial configuration and state information to the first server process (e.g., Server A), and the second agent process (e.g., Agent B) sends initial configuration and state information to the second server process (e.g., Server B). Each server process maintains a copy of the data sent by the agent processes. For example, Server A 130 has a copy of data 132, and Server B 140 has a copy of data 142.

Figure 3:
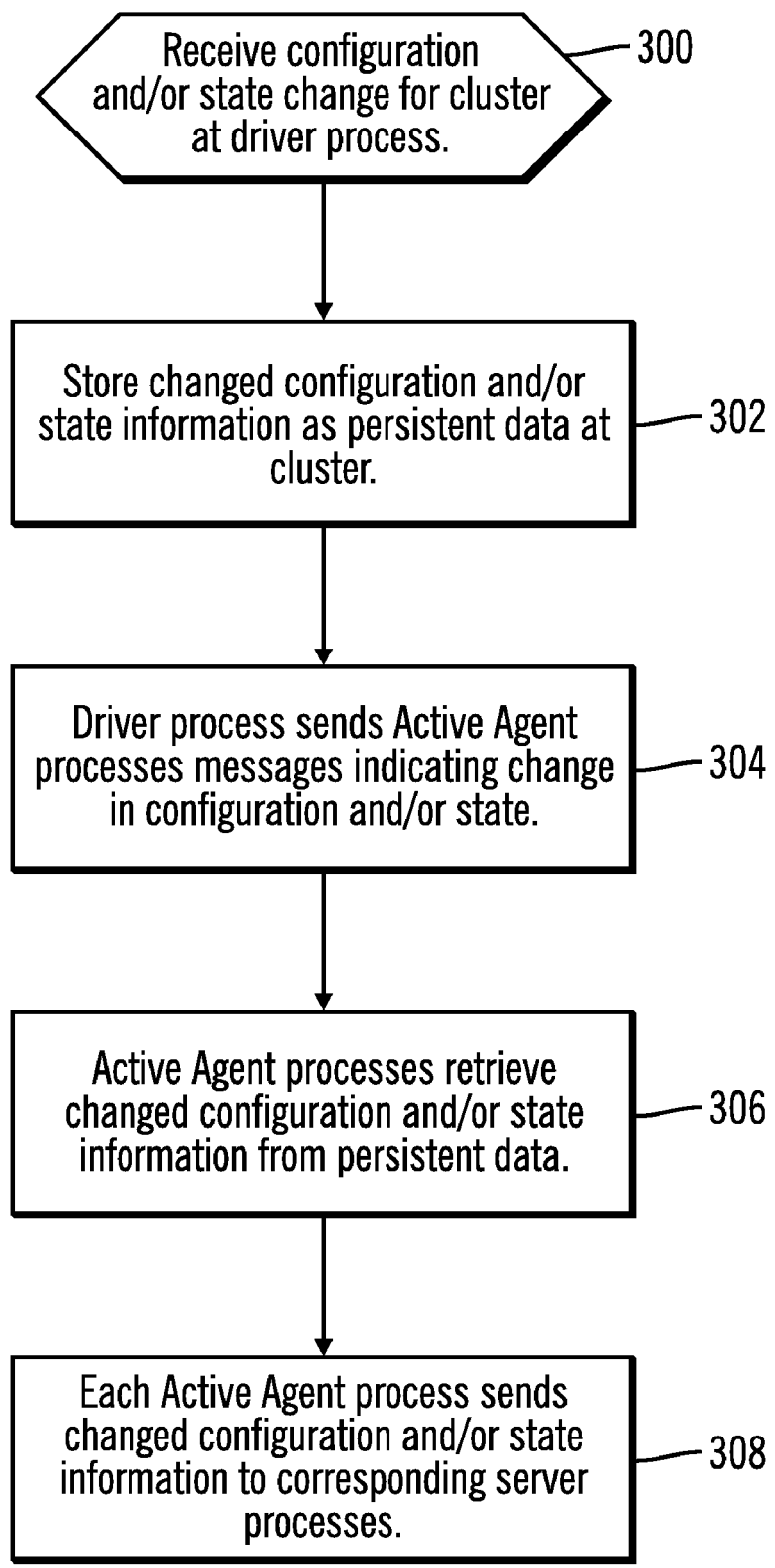
FIG. 3 illustrates logic for configuration and/or state changes at one cluster in accordance with certain implementations of the invention.

FIG. 3 illustrates logic for configuration and/or state changes at one cluster in accordance with certain implementations of the invention. Control begins at block 300 with the driver process at the cluster (e.g., Driver-1 124 in cluster 111) receiving changed configuration information (e.g., a storage device has been added or deleted from the cluster) and/or state information (e.g., a storage device has gone from available to unavailable). Although examples herein refer to a particular process (e.g., a driver process) performing processing, the process referred to may actually invoke one or more other functions or processes to perform the processing.

In block 302, the changed configuration and/or state information is stored as persistent data at the cluster. In block 304, the active agent processes are sent messages by the driver process indicating that there has been a change in configuration and/or state at the cluster. In certain implementations of the invention, when the driver process recognizes a change in configuration and/or state information, the driver process broadcasts the information (e.g., the addition or removal of a resource) within the cluster. In block 306, active agent processes retrieve changed configuration and/or state information from persistent data. In block 308, the active agent processes send changed configuration and/or state information to corresponding server processes.

Figure 4:
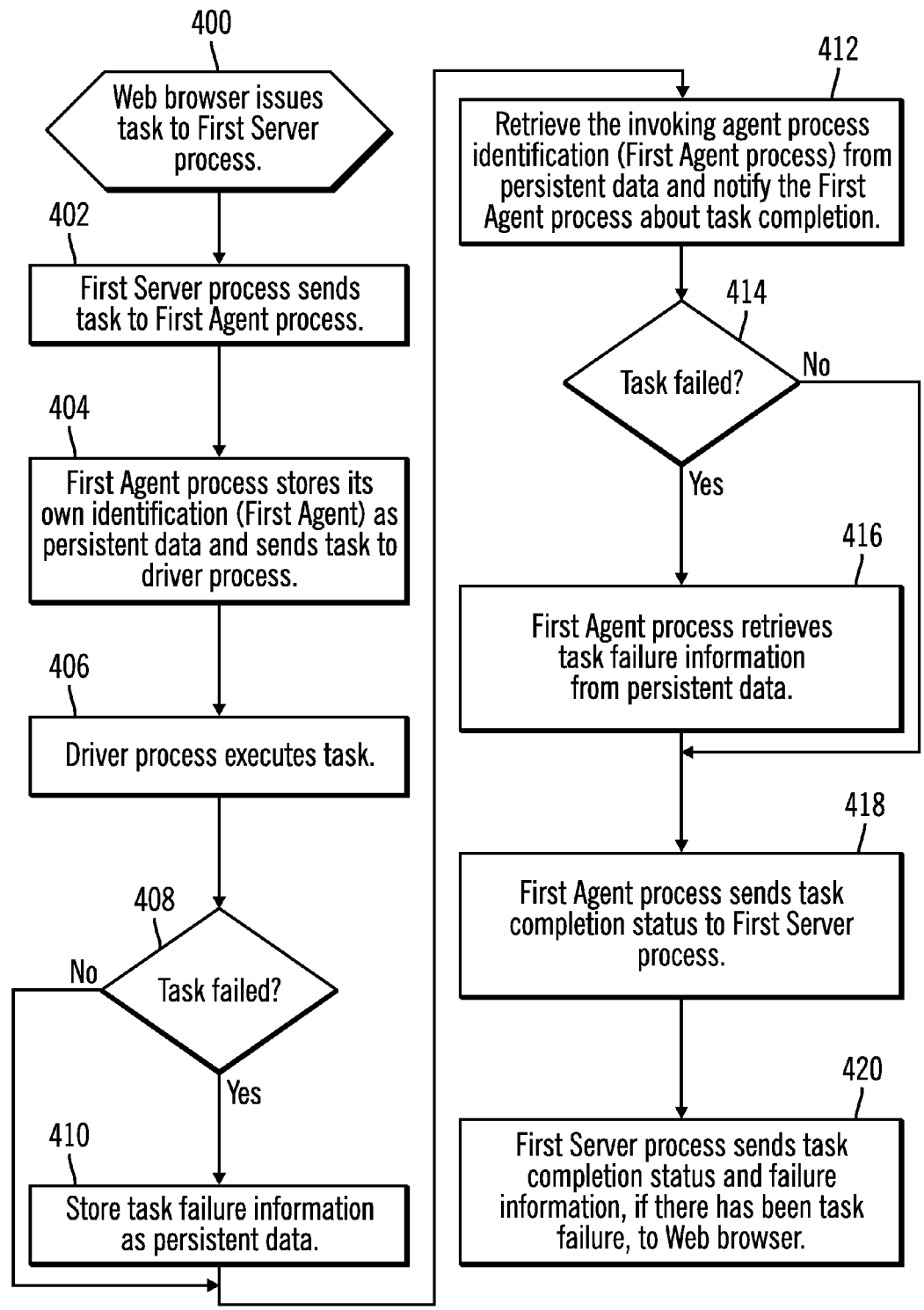
FIG. 4 illustrates task execution and response at one cluster in accordance with certain implementations of the invention.

FIG. 4 illustrates task execution and response at one cluster in accordance with certain implementations of the invention. Control begins at block 400 with a Web browser issuing a task to a first server process (e.g., Server A). In certain implementations of the invention, a user selects a server process that is to execute a task at the hardware console 160. In block 402, the first server process sends the task to a first agent process. In block 404, the first agent process stores its own identification (e.g., "Agent A") as persistent data and sends the task to a driver process. In block 406, the driver process executes the task.

In block 408, it is determined whether the task failed. If so, processing continues to block 410, otherwise, processing continues to block 412. In block 410, task failure information is stored as persistent data in the appropriate cluster of the agent process. In block 412, the driver process retrieves the invoking agent process identification from persistent data, which in this case is the first agent process identification, and notifies the first agent process about task completion. In certain implementations of the invention, the driver process invokes a task completion process to update task failure information in the persistent data, determine which agent process requested task processing, and to notify the agent process of the task completion.

In block 414, it is determined whether the task failed. If so, processing continues to block 416, otherwise, processing continues to block 418. In block 416, the first agent process retrieves task failure information from persistent data. In block 418, the first agent process sends task completion status to the first server process. In block 420, the first server process sends task completion status and failure information, if there has been a task failure, to the browser. This logic occurs for each other server process (e.g., Server B) and agent process (e.g., Agent B) pair.

In summary, the configuration of implementations of the invention allows for two or more fully functional servers to be configured for all clusters in the domain. Both server processes in the domain are detected when a cluster is started. The server process in the domain is started when a cluster is started that is configured as a domain server. Also, two agent processes in the cluster are started, one for each server process. Each agent process manages communication with a corresponding server process.

If an error occurs between one agent/server pair and the pair fails, another agent/server pair would be unaffected by this failure. Thus, if a task fails on one agent/server pair due to unavailability of the pair, a user can tell a second agent/server pair to execute the task. With implementations of the invention, since there are two agent processes, the communication is performed in parallel, concurrently.

Furthermore, the techniques described herein for dual active server processes are applicable in any network environment in which there are some set of agent processes that need to be coordinated. Implementations of the invention provide the ability of agent processes to interoperate with a pair of server processes in a away that provides continuous availability to a server process when at least one of the dual active servers is active. The underlying processes that are being executed by the server are not limited to any specific application.

Although examples herein refer to monitoring of configuration and state information of storage devices, implementations of the invention are not limited to such monitoring. That is, the dual active server processes described in the invention are easily extended by those skilled in the art to other applications besides the monitoring of storage devices. In particular, implementations of the invention are applicable to any set of processes or services that can be requested by multiple sources (e.g., agent processes) and are managed by a one or more providers (e.g., server processes) to provide non-disruptive operation of an overall system. Examples of other applications that might benefit from the invention include, but are not limited to, real time management and control of physical plants (factories, power plants, machinery), real time management of online transaction processing systems (Automated Teller Machines (ATMs), stock exchanges, airline ticketing, etc.), real time management of computer systems (disaster recovery processes, networked printer queues, etc.), and real time management of communication networks (telephony, private branch exchanges (PBXs), etc.).

Enterprise Storage Server is a registered trademark or trademark of International Business Machines Corporation in the United States and/or other countries.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which described embodiments are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 2C, 3, and 4 describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, 2C, 3, and 4 may be implemented in software, hardware, in programmable and non-programmable gate array logic or some combination of these.

Figure 5:
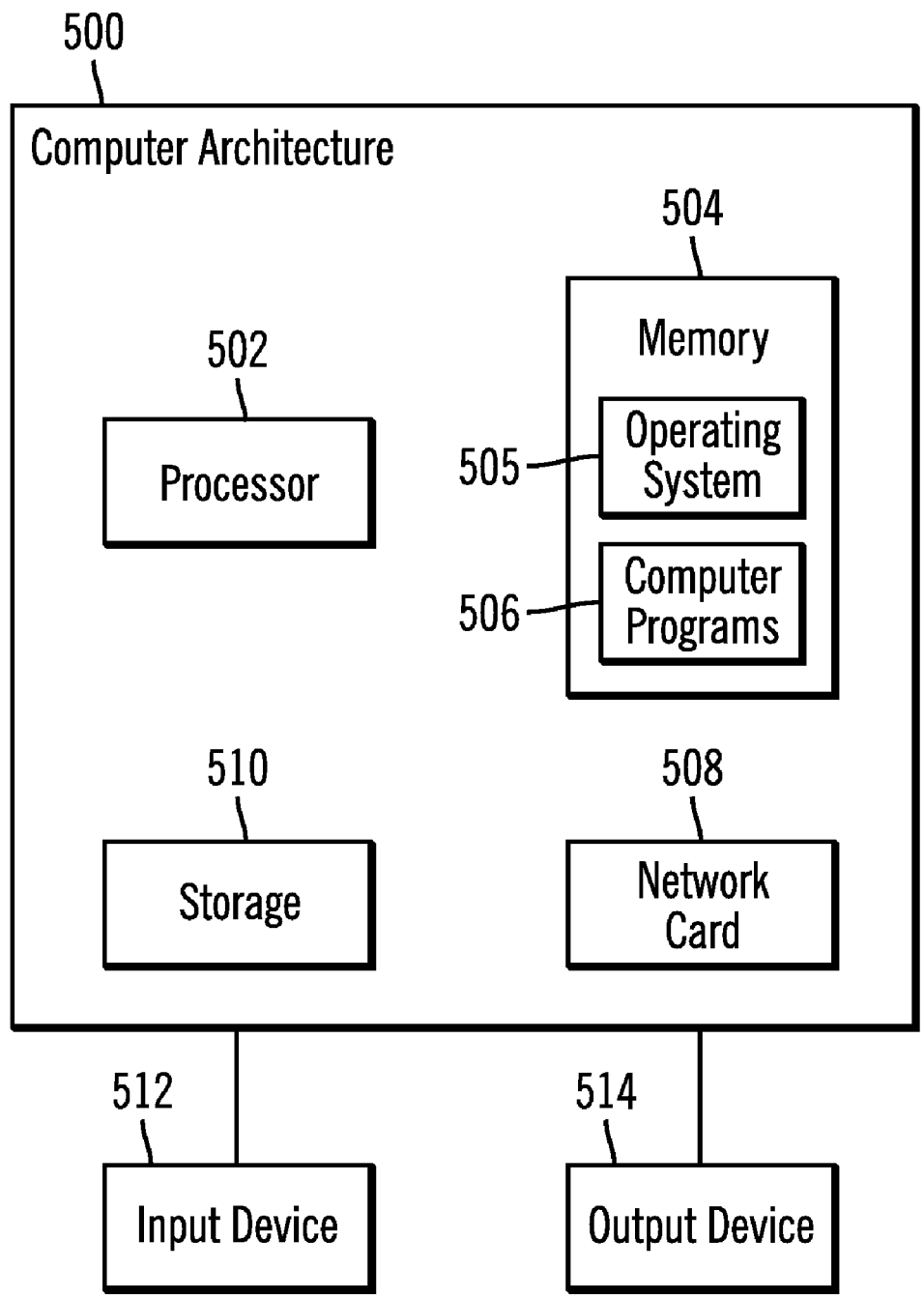
FIG. 5 illustrates one implementation of the architecture of server systems in accordance with certain implementations of the invention.

FIG. 5 illustrates one implementation of the architecture of the server systems 102, 104, 106, and 108 in accordance with certain implementations of the invention. The computer systems 102, 104, 106, and 108 may implement a computer architecture 500 having a processor 502 (e.g., a microprocessor), a memory 504 (e.g., a volatile memory device), a network card 508, and storage 510 (e.g., a non-volatile storage area, such as magnetic disk drives, optical disk drives, a tape drive, non-volatile RAM, etc.). An operating system 505 may execute in memory 504. The storage 508 may comprise an internal storage device or an attached or network accessible storage. Computer programs in the storage 510 are loaded into the memory 504 and executed by the processor 502 in a manner known in the art. A network card 508 enables communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information transmitted from the processor 502, or other component, such as a display monitor, printer, storage, etc.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A system, comprising:
    at least two active server processes, including a first server process and a second server process, adapted to perform tasks issued by a browser, wherein the first server process and the second server process are each on a different cluster configured to be a domain server, wherein the first server process and the second server process each have a list of agent processes within a domain that are registered with that server process, and wherein the first server process and the second server process each forward each task issued by the browser to that server process to a registered agent process to perform that task;
    a server system comprising two clusters, wherein each of the two clusters is aware of the first server process and the second server process;
    wherein each of the two clusters includes:
        a first agent process at the cluster that is registered with the first server process to notify the first server process that the first agent process exists to perform tasks for the first server process to complete the tasks issued by the browser, wherein the first agent process and the first server process form a first agent/server pair;
        a second agent process at the cluster that is registered with the second server process to notify the second server process that the second agent process exists to perform tasks for the second server process to complete the tasks issued by the browser, wherein the second server process is different from the first server process with which the first agent process is registered, wherein the second agent process and the second server process form a second agent/server pair; and
        wherein when one of the first agent/server pair and the second agent/server pair fails, the other of the first agent/server pair and the second agent/server pair continues processing in the cluster.

2. The system of claim 1, wherein one of the two clusters is a first cluster, wherein the first server process executes at a second cluster, and wherein the second server process executes at a third cluster.

3. The system of claim 1, wherein the first server process executes at a first cluster and the second server process executes at a second cluster.

4. The system of claim 1, wherein at least one of the first server process and the second server process execute at a host system.

5. The system of claim 1, further comprising:
    persistent data at each of the two clusters storing configuration and state information for one or more storage devices accessed by the cluster, wherein the configuration information includes how many storage devices are in the cluster, and wherein the state information includes an indication of whether each storage device is available or unavailable.

6. The system of claim 1, further comprising:
    means for, when the first server process and first agent process fail while executing a task, executing the task with the second server process and second agent process.

7. The system of claim 1, further comprising:
    means for, when the first server process and first agent process fail while executing a first task, continuing to execute a second task with the second server process and second agent process.

8. The system of claim 1, further comprising:
    means for detecting a first server and a second server;
    means for registering the first agent process with the first server process at the first server;
    means for registering the second agent process with the second server process at the second server;
    means for, when a task is to be executed by the first server process, executing the task with the first agent process; and
    means for, when the task is to be executed by the second server process, executing the task with the second agent process.

9. The system of claim 1, wherein the first agent process and the second agent process are launched at one of the two clusters and further comprising:
    means for collecting configuration information, including how many storage devices are in the cluster, and state information, including whether each storage device is available or unavailable;
    means for storing the configuration and state information as persistent data at the cluster;
    under control of the first agent process in the first agent/server pair,
        (i) means for retrieving stored configuration and state information; and
        (ii) means for transmitting the retrieved configuration and state information to the first server process in the first agent/server pair; and
    under control of the second agent process in the second agent/server pair,
        (i) means for retrieving stored configuration and state information; and
        (ii) means for transmitting the retrieved configuration and state information to the second server process in the second agent/server pair.

10. The system of claim 1, wherein the first agent process and the second agent process are launched at one of the two clusters, and further comprising:
    means for receiving at least one of changed configuration information and changed state information for the cluster, wherein the configuration information includes how many storage devices are in the cluster, and wherein the state information includes an indication of whether each storage device is available or unavailable; and
    means for storing the at least one of changed configuration information and changed state information as persistent data at the cluster;
    means for broadcasting the at least one of changed configuration information and changed state information for the cluster; and
    under control of the first agent process in the first agent/server pair,
        (i) means for retrieving the stored at least one of changed configuration information and state information; and (ii) means for transmitting the retrieved at least one of changed configuration information and state information to the first server process in the first agent/server pair; and under control of the second agent process in the second agent/server pair, (i) means for retrieving the stored at least one of changed configuration information and state information; and (ii) means for transmitting the retrieved at least one of changed configuration information and state information to the second server process in the second agent/server pair.

11. The system of claim 1, wherein the first agent process is launched if a first server is configured and wherein the second agent process is launched if a second server is configured.

12. The system of claim 1, further comprising:

under control of the first agent process, means for receiving a request to execute the task from the first server process;

means for storing identification for the first agent process in persistent data;

means for invoking a driver process for executing the task;

means for receiving task completion status from the driver process; and means for forwarding the task completion status to the first server process.

13. An article of manufacture embodied as a computer readable storage medium for task processing and monitoring of configuration and state information, wherein the article of manufacture is capable of causing operations to be performed, the operations comprising:

detecting a server comprising two clusters, wherein the server is adapted to perform tasks issued by a browser, wherein each of the two clusters is aware of a first server process and a second server process, wherein the first server process and the second server process are each on a different cluster configured to be a domain server, wherein the first server process and the second server process each have a list of agent processes within a domain that are registered with that server process, and wherein the first server process and the second server process each forward each task issued by the browser to that server process to a registered agent process to perform that task;

at each of the two clusters, registering a first agent process with a first server process to notify the first server process that the first agent process exists to perform tasks for the first server process to complete the tasks issued by the browser, wherein the first agent process and the first server process form a first agent/server pair;

registering a second agent process with a second server process to notify the second server process that the second agent process exists to perform tasks for the second server process to complete the tasks issued by the browser, wherein the second server process is different from the first server process with which the first agent process is registered, wherein the second agent process and the second server process form a second agent/server pair;

when a task is to be executed by the first server process, executing the task with the first agent process;

when the task is to be executed by the second server process, executing the task with the second agent process; and wherein when one of the first agent/server pair and the second agent/server pair fails, the other of the first agent/server pair and the second agent/server pair continues processing in the cluster.

14. The article of manufacture of claim 13, wherein the operations further comprise:

at each of the two clusters, storing configuration and state information for one or more storage devices accessed by that cluster as persistent data at the cluster, wherein the configuration information includes how many storage devices are in the cluster, and wherein the state information includes an indication of whether each storage device is available or unavailable.

15. The article of manufacture of claim 14, wherein the first agent process is launched at one of the two clusters and wherein the operations further comprise:

collecting configuration information, including how many storage devices are in the cluster, and state information, including whether each storage device is available or unavailable;

storing the configuration and state information as persistent data at the cluster;

under control of the first agent process in the first agent/server pair, (i) retrieving the stored configuration and state information; and (ii) transmitting the retrieved configuration and state information to the first server process in the first agent/server pair.

16. The article of manufacture of claim 14, wherein the second agent process is launched at one of the two clusters and wherein the operations further comprise:

collecting configuration information, including how many storage devices are in the cluster, and state information, including whether each storage device is available or unavailable;

storing the configuration and state information as persistent data at the cluster;

under control of the second agent process in the second agent/server pair, (i) retrieving the stored configuration and state information; and (ii) transmitting the retrieved configuration and state information to the second server process in the second agent/server pair.

17. The article of manufacture of claim 14, wherein the first agent process is launched at one of the two clusters and wherein the operations further comprise:

receiving at least one of changed configuration information and changed state information for the cluster, wherein the configuration information includes how many storage devices are in the cluster, and wherein the state information includes an indication of whether each storage device is available or unavailable;

storing the at least one of changed configuration information and changed state information as persistent data at the cluster;

broadcasting the at least one of changed configuration information and changed state information for the cluster; and under control of the first agent process in the first agent/server pair, (i) retrieving the stored at least one of changed configuration information and state information; and (ii) transmitting the retrieved at least one of changed configuration information and state information to the first server process in the first agent/server pair.

18. The article of manufacture of claim 14, wherein the second agent process is launched at one of the two clusters and wherein the operations further comprise:
    receiving at least one of changed configuration information and changed state information for the cluster, wherein the configuration information includes how many storage devices are in the cluster, and wherein the state information includes an indication of whether each storage device is available or unavailable;
    storing the at least one of changed configuration information and changed state information as persistent data at the cluster;
    broadcasting the at least one of changed configuration information and changed state information for the cluster; and
    under control of the second agent process in the second agent/server pair,
        (i) retrieving the stored at least one of changed configuration information and state information; and
        (ii) transmitting the retrieved at least one of changed configuration information and state information to the second server process in the second agent/server pair.

19. The article of manufacture of claim 13, wherein the first agent process is launched if a first server is configured and wherein the second agent process is launched if a second server is configured.

20. The article of manufacture of claim 13, wherein the operations further comprise:
    under control of the first agent process,
        receiving a request to execute the task from the first server process;
        storing identification for the first agent process in persistent data;
        invoking a driver process for executing the task;
        receiving task completion status from the driver process; and
        forwarding the task completion status to the first server process.

21. The article of manufacture of claim 13, wherein the operations further comprise:
    under control of the second agent process,
        receiving a request to execute the task from the second server process;
        storing identification for the second agent process in persistent data;
        invoking a driver process for executing the task;
        receiving task completion status from the driver process; and
        forwarding the task completion status to the second server process.

\* \* \* \* \*